Patented July 18, 1933

1,918,941

UNITED STATES PATENT OFFICE

BRUNO UEBLER, OF BERLIN, GERMANY

METHOD OF PRODUCING NITRATES

No Drawing. Original application filed June 17, 1929, Serial No. 371,707, and in Germany September 17, 1927. Divided and this application filed June 13, 1931. Serial No. 544,283.

My invention refers to the production of nitrates and has for its particular object to produce nitrates from chlorides and nitric acid or nitrous gases without losing any nitrogen.

In the production of nitrates on a big scale the starting material must be readily available and therefore nitrous gases or nitric acid on the one hand and metal chlorides, more especially potassium chloride, on the other hand are used for this purpose, the reaction occurring on heating. All the processes hitherto devised, however, do not pay sufficient attention to the losses of nitrogen arising in the reactions. In order to exclude any such losses, the reaction $$KCl + HNO_3 = KNO_3 + HCl \quad (I)$$

must take place quantitatively in such manner that all the chlorine escapes in the form of hydrochloric acid or that according to the reaction $$HNO_3 + 3HCl = 2H_2O + NO + 3Cl \quad (II)$$

all the chlorine escapes as such, without any nitrogen oxide being lost.

In reality, however, the reaction II as a rule occurs, differently, viz.

$$HNO_3 + 3HCl = 2H_2O + NOCl + 2Cl \quad (IIa)$$

nitrosyl chloride being formed. The difficulty of separating Cl from NO rendered all prior processes uncommercial.

In my copending application for Letters Patent of the United States Serial No. 371,707 I have described a method of producing nitrates from chlorides and nitric acid or nitrous gases which consists in heating a metal chloride with nitric acid or nitrous gases and conducting the nitrosyl chloride resulting in the reaction over iron either at ordinary temperature to form an addition compound of nitrosyl chloride and ferric chloride, or at an elevated tempeature to form ferric chloride, whereby a corresponding amount of chlorine is linked to the iron.

According to the present invention I obtain a similar result by conducting the nitrosyl chloride or the gas mixture containing same at an elevated temperature over quicklime. The chlorine is then combined with calcium, while the nitrogen oxides escape. I may treat in this way the original gas mixture obtained by the interaction of chlorides and nitric acid or nitrous gases, but I may also decompose in this manner the nitrosyl chloride after it has been purified in some suitable manner. In each case the chlorine is retained in the form of calcium chloride while the nitrogen oxides in a more or less pure form are returned directly or indirectly into the liquor from which the original mixture of Cl and NOCl was obtained.

Example

The gas mixture obtained in acting with nitric acid on potassium chloride contained 9% nitrosyl chloride, 13.5% chlorine and 77.5% nitrogen. 10 cbms. of this gas mixture were conducted at 500° C. over 7 kilograms quicklime. There were obtained 11.4 kilograms of a mixture of 22% CaO and 78% $CaCl_2$, the escaping gas mixture consisting of 82% nitrogen, 9% NO and 9% oxygen.

Various changes may be made in the details disclosed in the foregoing specification without departing from my invention or sacrificing the advantages thereof.

I claim:—

The process of producing nitrates from chlorides and nitric acid or nitrous gases comprising heating a metal chloride with nitric acid or nitrous gases and conducting the nitrosyl chloride resulting from the reaction over calcium oxide at an elevated temperature to form calcium chloride.

BRUNO UEBLER.